US012516270B2

(12) United States Patent
Probasco et al.

(10) Patent No.: US 12,516,270 B2
(45) Date of Patent: Jan. 6, 2026

(54) SAFE FORMULATION FOR A MULTI-PURPOSE CLEANING SOLUTION

(71) Applicant: inShield Wiper, LLC, San Marcos, CA (US)

(72) Inventors: Ramona Marie Probasco, San Marcos, CA (US); Timothy Paul Probasco, San Marcos, CA (US)

( * ) Notice: Subject to any disclaimer, the term of this patent is extended or adjusted under 35 U.S.C. 154(b) by 947 days.

(21) Appl. No.: 17/481,128

(22) Filed: Sep. 21, 2021

(65) Prior Publication Data

US 2022/0089973 A1 Mar. 24, 2022

Related U.S. Application Data

(60) Provisional application No. 63/081,850, filed on Sep. 22, 2020.

(51) Int. Cl.

| | |
|---|---|
| ***C11D 1/12*** | (2006.01) |
| ***B08B 3/02*** | (2006.01) |
| ***B08B 3/04*** | (2006.01) |
| ***C11D 1/14*** | (2006.01) |
| ***C11D 3/00*** | (2006.01) |
| ***C11D 3/18*** | (2006.01) |
| ***C11D 3/43*** | (2006.01) |
| ***C11D 3/50*** | (2006.01) |
| ***C11D 9/44*** | (2006.01) |

(52) U.S. Cl.

CPC ................ *C11D 3/184* (2013.01); *B08B 3/02* (2013.01); *B08B 3/04* (2013.01); *C11D 1/143* (2013.01); *C11D 3/0005* (2013.01); *C11D 3/43* (2013.01)

(58) Field of Classification Search

CPC ........... C11D 1/12; C11D 1/14; C11D 3/2006; C11D 3/50; C11D 9/44; B08B 3/04

See application file for complete search history.

(56) References Cited

U.S. PATENT DOCUMENTS

| | | | | |
|---|---|---|---|---|
| 2009/0111724 | A1 * | 4/2009 | Kaaret | C11D 3/2044 510/109 |
| 2010/0143494 | A1 * | 6/2010 | Scheuing | C11D 3/48 424/618 |
| 2020/0131454 | A1 * | 4/2020 | Copeland | C11D 1/94 |

FOREIGN PATENT DOCUMENTS

| | | | | | |
|---|---|---|---|---|---|
| GB | 2579876 A | * | 7/2020 | C11D 11/0017 |
| WO | WO 2018/222629 | * | 12/2018 | C11D 3/20 |
| WO | WO-2018222629 A1 | * | 12/2018 | C11D 1/662 |

* cited by examiner

*Primary Examiner* — Brian P Mruk

(74) *Attorney, Agent, or Firm* — DLA Piper LLP (US)

(57) ABSTRACT

Disclosed herein is a safe formulation for a multi-purpose cleaning solution. Each ingredient included in the formulation may be on the EPA Safer Ingredients List. The formulation may be used to clean a variety of surfaces including glass and sensitive surfaces such as electronic screens, touchscreens, computer monitors and flat screen TVs. The formulation may also be used to clean a variety of other surfaces including stainless steel, dry erase boards, and composite materials incorporated into household surfaces and interior and exterior surfaces of automobiles, planes, boats, and the like. The formulation may also be used to clean interior and exterior surfaces of campers, trailers, satellite lenses, hospitals, offices, schools, and other places having multiple surfaces.

21 Claims, No Drawings

SAFE FORMULATION FOR A MULTI-PURPOSE CLEANING SOLUTION

PRIORITY CLAIM

This application claims priority pursuant to 35 USC § 119(e) to U.S. provisional patent application No. 63/081,850 filed Sep. 22, 2020. The aforementioned application is hereby incorporated by reference as though fully set forth.

TECHNICAL FIELD

This application relates to the field of cleaning products. More specifically, this application relates to safe product formulations of cleaning solutions that include natural cleaning agents and methods of making such solutions.

BACKGROUND

Household cleaning solutions are used every day to clean a wide variety of products and surfaces. Current cleaning solutions are specialized and effective on only some types of surfaces. For example, solutions that are gentle enough to be used on glass and electronics are not strong enough to clean stainless steel, wood, laminate, composites, and other types of surfaces. This results in the inability to use the same cleaning cloth or cleaning device to safely clean diverse surfaces due to the cross contamination caused by having to use different cleaning solutions for the divergent surfaces. Additionally, many cleaning solutions contain chemicals that are harmful to touchscreens and other display screens of phones, computers, televisions, and other electronic devices. These chemicals can damage sensitive electronic screens by interacting with the electronics and/or structures on the surface of the display screen. Current cleaning solutions also leave a residue after they are wiped off a surface and cause streaks.

Many multi-purpose cleaning solutions also use harsh chemicals that adversely affect the environment. Manufacture, use, and disposal of cleaning solutions containing synthetic chemicals pollutes the environment because the synthetic chemicals do not readily decompose in nature. Cleaning solutions including synthetic chemicals also produce an unappealing odor during use and may irritate a user's eyes and/or skin. Therefore, there is a need for a cleaning solution formulated from natural products and safe ingredients that cleans multiple surfaces including glass, electronic screens, stainless steel, and the like without causing cross contamination.

SUMMARY

Disclosed herein is a safe formulation for a multi-purpose cleaning solution comprising one or more ingredients. The ingredients may include at least one of a natural cleaning agent, a degreaser, a disinfectant, a preservative, one or more solvents, and, optionally, a surfactant.

DETAILED DESCRIPTION

Reference will now be made in detail to embodiments. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the invention to these particular embodiments. In other instances, well-known components have not been described in detail so as not to unnecessarily obscure aspects of the embodiments of the invention.

In the disclosure, ingredient amounts are generally listed in ranges or levels of ingredients. Unless otherwise stated, amounts listed in percentage ("% wt.'s" are in weight percent based on a 100% total weight of the solution). Each cleaner formulation and cleaner formulation component is discussed in detail below.

Natural Formulation for a Multi-Purpose Cleaner

Disclosed herein are multi-purpose cleaning solutions formulated specifically to safely and effectively clean a broad spectrum of surfaces including glass, electronic screens, touchscreens, stainless steel, composites, and other surfaces. The cleaning solutions of the disclosure may be made with ingredients that are on the EPA Safer Ingredients List and can safely clean all glass, all electronic screens, and all stainless steel without leaving residue, streaking or causing damage. Cleaning solutions of the present disclosure may have a pleasant odor because they may be made with natural ingredients instead of harsh chemicals. For example, the cleaning solution may have an aromatic citrus scent.

The multi-purpose cleaning solutions described herein can be used to clean interior and exterior surfaces of an automobile windshield and automobile windows, electronic screens, touchscreens, computer monitors, flat screen TVs, dry erase boards, all household glass and mirrors, stainless steel, and other household surfaces (e.g., countertops, tabletops, tile, laminate, and the like). The multi-purpose cleaning solution can also clean surfaces included in airplanes, boats, campers, trailers, satellite lenses, hospitals, offices, schools, and any other place having multiple surfaces.

The multi-purpose cleaning solutions described herein comprise formulations of safe, natural ingredients. All of ingredients included in the cleaning solution formulations may be on the EPA Safer Ingredients List. The formulations described herein may include one or more solvents, one or more disinfectants, one or more natural cleaning agents, one or more degreasers, one or more fragrances, one or more surfactants, and/or one or more preservatives. For example, the one or more solvents may include polar solvents such as deionized water as well as organic solvents such as isopropyl alcohol and other alcohols. The one or more degreasers may include, for example, (d)-Limonene or other degreasers. The (d)-Limonene may also function as a disinfectant and/or solvent. The total volume of the one or more degreasers may be limited to less than 3% wt. of the total formulation to prevent the solution from forming a film residue or streaks when wiped off of a surface. The one or more natural cleaning agents may include a blend of one or more natural cleaning agents and one or more fragrances, for example, essential oils such as orange essence oil and fragrances such as citrus fragrance. One or more other essential oils and/or fragrances may also be used. The one or more surfactants may help emulsify the one or more essential oils or other natural cleaning agents in the solution. Exemplary surfactants that may be included in the formulation include palm oil, sodium dodecyl sulfate, potassium oleate, and the like. The one or more preservatives may include methylisothiazolinone and octylisothiazolinone (i.e., 3(2H)-Isothiazolone, 2-octyl-) which comprise Bioban 425. Other preservatives may include leucidal SF Max, acticide LPN5, and the like.

In one embodiment, the safe formulation for the multi-purpose cleaning solution includes between: 70-98% wt.

water and/or deionized water; 2-15% wt. isopropanol; 0.01-5% wt. (d)-Limonene; 0.01-8% wt. orange essence oil; 0.01-2% wt. methylisothiazolinone; and/or 0.1-2% wt. octylisothiazolinone. Other embodiments of the safe formulation for the multi-purpose cleaning solution may include other types of ingredients or different ingredients. For example, other embodiments of the safe formulation for the multi-purpose cleaning solution may include other solvents, other natural cleaning agents, other degreasers, other disinfectants, other fragrances, other surfactants, and/or other preservatives.

Making the Multi-Purpose Cleaning Solution

The safe multi-purpose cleaning formulation may be made using a blending process that sequentially combines and blends the ingredients in a gradual manner. The ingredients may be added into a solution in a series of stages to facilitate the blending process and ensure all of the ingredients form a stable solution. Each of the series of stages may involve adding one or more ingredients into a solution to form a mixture. Each mixture may be stirred continuously for a pre-determined period of time before adding additional ingredients. The mixtures may be stirred continuously using an electronic stirring device or any other apparatus configured to continuously stir a solution. In addition to continuous stirring, the mixtures of ingredients may be blended using an intermittent stirring process that includes a period of stirring followed by periods of no stirring. The intermittent stirring process allows the solution to settle between periods of mixing and can be used to improve the solubility of some ingredients and/or the stability of the solution. Other stirring methods that expose the solution to temperatures above room temperature or pressure above atmospheric pressure can also be used to help combine the ingredients into a stable solution.

In various embodiments, to make the safe multi-purpose cleaning formulation, one or more solvents may be combined to form a first mixture. The first mixture may then be stirred continuously for 10-15 minutes or any other period of time. For example, a first mixture of deionized water may be blended with isopropyl alcohol for 10-15 minutes. One or more degreasers, for example, (d)-limonene, may then be added to the one or more solvent mixture included in the first mixture to form a second mixture. The second mixture may then be continuously stirred for 10-15 minutes and/or any other period of time. One or more natural cleaning agents, for example, orange essence oil, may then be added to the second mixture including the solvents and the one or more degreasers to form a third mixture. The third mixture may then be continuously stirred for 10-15 minutes and/or any other period of time. In various embodiments, to help emulsify the natural cleaning agent into the solution, one or more surfactants, for example, sodium dodecyl sulfate, may be added to the third mixture immediately after the one or more natural cleaning agents. The third mixture including the solvents, the one or more degreasers, the one or more natural cleaning agents, and the one or more surfactants may then be continuously stirred for 10-15 minutes or any other period of time. One or more preservatives may also be included in the formulation to extend the effective life of the natural cleaning agent. The one or more preservatives, such as, Bioban 425, may be added to the third mixture to form a fourth mixture. The fourth mixture may then be continuously stirred for 10-15 minutes. One or more other ingredients may also be added in stages using the process described above for mixtures 1 through 4. Once the continuous stirring process for the final ingredient is complete, the safe multi-purpose cleaning solution is stable and ready to use.

One or more ingredients may be pre-blended to help solubilize one or more ingredients of the formulation in the solution. The pre-blended mixture of one or more ingredients may be added to one or more of the first through the fourth mixtures described above during the blending process. The pre-blended mixture may also be included in a blending process that uses the pre-blended mixture as a base solution and gradually adds ingredients to the base mixture. For example, one or more degreasers, one or more natural cleaning agents, and one or more preservatives may be pre-blended with one or more solvents, for example, an organic solvent such as isopropyl alcohol, to help solubilize the natural cleaning agent in the organic solvent. To make the pre-blended solution, ingredients may be added to the organic solvent one by one and continuously stirred for 10-15 minutes or any other time period as described above. The pre-blended solution may then be combined with one or more different solvents and continuously stirred for 10-15 minutes or any other period of time. Additional ingredients may then be added individually to the mixture of the pre blended solution and the second solvent and continuously stirred for 10-15 minutes or any other period of time until the formulation is complete. In various embodiments, a pre-blended solution of the orange essence oil and isopropyl alcohol may be formed to facilitate solubilizing the orange essence oil with the isopropyl alcohol before mixing with the other ingredients. Forming the pre-blended solution may improve the stability of the orange essence oil in the formulation and extend the usable life of the multi-purpose cleaning solution.

Using the Multi-Purpose Cleaning Solution

The multi-purpose cleaning solution may be used to clean a variety of surfaces including glass, electronic screens, stainless steel, composite surfaces, and the like. To clean electronic screens, touchscreens, glass, mirrors, and interior windshields a light misting of the multi-purpose cleaning solution may be sprayed directly onto a cleaning cloth or a cleaning device. The cleaning device may include a pad with two elastic straps that slip over the palm and/or the back of a user's hand. The cleaning device may also include a wand or extendable pole attached to the pad that may be used to extend the reach of the cleaning device in order to clean floors, ceilings, and other hard to reach surfaces. To clean using the cleaning device, the multi-purpose cleaning solution is sprayed directly onto the surface to be cleaned and/or the pad of the cleaning device. Once applied to the surface and/or pad, the multi-purpose cleaning solution may then be wiped over the surface and removed to wipe the surface clean using the cleaning device. For example, to clean stainless steel or composite surfaces, a light misting of the solution may be sprayed directly onto the stainless steel or composite surface. The solution may then be wiped over the surface and removed to wipe the surface clean using the cleaning cloth or cleaning device. When cleaning other surfaces, light misting of the solution may be sprayed directly onto the surface and wiped clean with the cleaning cloth or cleaning device.

To clean electronic devices, it may be important not to spray the cleaning solution directly onto electronic screens and touchscreens to prevent the cleaning solution from running down the screen and into the working electronics included in the device. The cleaning solution can cause damage to the device if it comes in contact with the electronics inside the device. Therefore, it is important to control the flow of cleaning solution over the device screen by using a cleaning cloth or a cleaning device. Once applied to the cleaning cloth or the cleaning device, the light misting of the cleaning solution may then be wiped directly on the electronic screen or glass and removed to wipe the surface clean using the dampened cloth or device. The solution may not be intended to be sprayed directly onto an electronic screen or touchscreen. Once applied to the pad of the cleaning device, a light misting of the multi-purpose cleaning solution may be wiped over the screen or other surface of the electronic device and wiped clean with a dry portion of the pad or a dry cleaning cloth.

What is claimed is:

1. A safe formulation for a multi-purpose cleaning solution comprising:

one or more natural cleaning agents;

one or more preservatives comprising 0.01-2% methylisothiazolinone, 0.1-2% octylisothiazolinone, or a combination thereof;

one or more solvents; and one or more degreasers, wherein the one or more degreasers include (d)-Limonene;

with the proviso that the safe formulation does not contain a surfactant.

2. The formulation of claim 1, wherein a total volume of the one or more degreasers is limited to less than 3% wt of a total volume of the safe formulation.

3. The formulation of claim 1, wherein the one or more natural cleaning agents include a blend including at least one natural cleaning agent and at least one fragrance.

4. The formulation of claim 3, wherein the blend includes an amount of at least one of an orange essence oil or an amount of citrus fragrance.

5. The formulation of claim 1, wherein a total volume of the one or more natural cleaning agents is between 0.01% wt and 2% wt of a total volume of the safe formulation.

6. The formulation of claim 1, wherein the one or more solvents include deionized water and isopropanol.

7. A method of making a safe formulation of claim 1, the method comprising:

combining one or more solvents into a first mixture;

continuously stirring the first mixture for a pre-determined period of time;

adding one or more degreasers to the first mixture to form a second mixture, wherein the one or more degreasers include (d)-Limonene;

continuously stirring the second mixture for the pre-determined period of time;

adding one or more natural cleaning agents to the second mixture to form a third mixture;

continuously stirring the third mixture for the pre-determined period of time;

adding one or more preservatives to the third mixture to form a fourth mixture, wherein the one or more preservatives comprise 0.01-2% methylisothiazolinone, 0.1-2% octylisothiazolinone, or a combination thereof; and continuously stirring the fourth mixture for the pre-determined period of time, thereby making the formulation.

8. The method of claim 7 further comprising:

combining the one or more natural cleaning agents with an organic solvent to form a pre-blended mixture;

continuously stirring the pre-blended mixture for the pre-determined period of time; and adding the pre-blend mixture to the second mixture.

9. The method of claim 7, wherein the pre-determined period of time is between 10 minutes and 15 minutes.

10. The method of claim 7, wherein the one or more natural cleaning agents include a blend including at least one natural cleaning agent and at least one fragrance.

11. The method of claim 10, wherein the blend includes at least one of an amount of orange essence oil or an amount of citrus fragrance.

12. The method of claim 7, wherein a total volume of the one or more natural cleaning agents is between 0.01% wt and 2% wt of a total volume of the safe formulation.

13. A method of using the safe formulation of claim 1 to clean a surface, the method comprising:

spraying a light misting of the safe formulation onto a cleaning cloth;

wiping the light misting of the safe formulation onto a surface using the cleaning cloth; and removing the cleaning cloth from the surface to wipe the surface clean.

14. The formulation of claim 1, comprising 0.01-2% wt. methylisothiazolinone.

15. The formulation of claim 1, comprising 0.1-2% wt. octylisothiazolinone.

16. The formulation of claim 1, comprising 0.01-2% wt. methylisothiazolinone and 0.1-2% wt. octylisothiazolinone.

17. The formulation of claim 1, wherein the one or more natural cleaning agents, the one or more preservatives, and the one or more solvents are on the EPA Safer Ingredients List.

18. The formulation of claim 1, consisting essentially of:

one or more natural cleaning agents;

one or more degreasers, wherein the one or more degreasers include (d)-Limonene;

one or more preservatives comprising 0.01-2% methylisothiazolinone, 0.1-2% octylisothiazolinone, or a combination thereof; and one or more solvents.

19. A safe formulation for a multi-purpose cleaning solution comprising:

70-98% wt. water and/or deionized water;

2-15% wt. isopropanol;

0.01-5% wt. (d)-Limonene;

0.01-8% wt. orange essence oil; and 0.01-2% wt. methylisothiazolinone;

with the proviso that the safe formulation does not contain a surfactant.

20. A safe formulation for a multi-purpose cleaning solution comprising:

70-98% wt. water and/or deionized water;

2-15% wt. isopropanol;

0.01-5% wt. (d)-Limonene;

0.01-8% wt. orange essence oil; and 0.1-2% wt. octylisothiazolinone;

with the proviso that the safe formulation does not contain a surfactant.

21. A safe formulation for a multi-purpose cleaning solution comprising:

70-98% wt. water and/or deionized water;

2-15% wt. isopropanol;

0.01-5% wt. (d)-Limonene;

0.01-8% wt. orange essence oil;

0.01-2% wt. methylisothiazolinone; and 0.1-2% wt. octylisothiazolinone;

with the proviso that the safe formulation does not contain a surfactant.

* * * * *